(12) United States Patent
Shkolnikov et al.

(10) Patent No.: US 11,278,887 B2
(45) Date of Patent: Mar. 22, 2022

(54) MICROFLUIDIC CHIP (71) Applicant: HEWLETT-PACKARD DEVELOPMENT COMPANY, L.P., Spring, TX (US)

(72) Inventors: Viktor Shkolnikov, Palo Alto, CA (US); Michael W. Cumbie, Corvallis, OR (US); Chien-Hua Chen, Corvallis, OR (US)

(73) Assignee: Hewlett-Packard Development Company, L.P., Spring, TX (US)

( * ) Notice: Subject to any disclaimer, the term of this patent is extended or adjusted under 35 U.S.C. 154(b) by 175 days.

(21) Appl. No.: 16/493,241

(22) PCT Filed: Apr. 21, 2017

(86) PCT No.: PCT/US2017/028891
§ 371 (c)(1),
(2) Date: Sep. 11, 2019

(87) PCT Pub. No.: WO2018/194665
PCT Pub. Date: Oct. 25, 2018

(65) Prior Publication Data
US 2020/0129979 A1 Apr. 30, 2020

(51) Int. Cl.
B01L 3/00 (2006.01)
(52) U.S. Cl.
CPC ..... *B01L 3/502715* (2013.01); *B01L 3/50273* (2013.01); *B01L 3/502784* (2013.01); *B01L 2200/028* (2013.01); *B01L 2200/0673* (2013.01); *B01L 2300/0645* (2013.01); *B01L 2400/0427* (2013.01)

(58) Field of Classification Search
CPC .......... B01L 3/502715; B01L 3/50273; B01L 3/502784; B01L 2200/028; B01L 2200/0673; B01L 2300/0645; B01L 2400/0427; B01L 2300/0816; G01N 1/00
See application file for complete search history.

(56) References Cited

U.S. PATENT DOCUMENTS

| 6,548,895 B1 | 4/2003 | Benavides et al. |
| 6,790,011 B1 | 9/2004 | Le Pesant et al. |

(Continued)

FOREIGN PATENT DOCUMENTS

| CN | 1499949 | 5/2004 |
| CN | 103170383 | 6/2013 |

(Continued)

OTHER PUBLICATIONS

Shih-Kang Fan; "Droplet-on-a-Wristband: Chip-to-Chip Digital Microfluidic Interfaces Between Replaceable and Flexible Electrowetting Modules"; Lab Chip, 2011, pp. 343-347.

(Continued)

*Primary Examiner* — Jennifer Wecker
*Assistant Examiner* — Oyeleye Alexander Alabi
(74) *Attorney, Agent, or Firm* — Fabian VanCott (57) ABSTRACT A microfluidic device is provided that includes a substrate and microfluidic sub-chips embedded in the substrate. An electric field is applied between an adjacent pair microfluidic sub-chips to move a fluid droplet from one of the adjacent pair of microfluidic sub-chips to another of the adjacent pair microfluidic sub-chips.

19 Claims, 8 Drawing Sheets

(56) References Cited

U.S. PATENT DOCUMENTS

| | | | |
|---|---|---|---|
| 6,821,819 B1 | 11/2004 | Benavides | |
| 7,524,464 B2 | 4/2009 | Chong et al. | |
| 7,547,380 B2 | 6/2009 | Velev | |
| 7,658,829 B2 | 2/2010 | Kanagasaba et al. | |
| 7,682,817 B2 | 3/2010 | Cohen et al. | |
| 7,754,150 B2 | 7/2010 | Wada et al. | |
| 8,021,961 B2 | 9/2011 | Sparks | |
| 8,403,557 B2 | 3/2013 | Li et al. | |
| 9,481,945 B2 | 1/2016 | Juncket et al. | |
| 9,421,544 B2 | 8/2016 | Wang | |
| 2003/0153119 A1 | 8/2003 | Nathan et al. | |
| 2003/0183525 A1 | 10/2003 | Elrod | |
| 2003/0215335 A1 | 11/2003 | Crivelli | |
| 2004/0028566 A1 | 2/2004 | Ko | |
| 2004/0163958 A1 | 8/2004 | Hung | |
| 2005/0196321 A1 | 9/2005 | Zhili | |
| 2007/0286773 A1 | 12/2007 | Schlautmann | |
| 2008/0169197 A1* | 7/2008 | McRuer | B01F 13/0086 204/600 |
| 2008/0199362 A1 | 8/2008 | Chong et al. | |
| 2008/0210306 A1 | 9/2008 | Xie | |
| 2009/0326279 A1 | 12/2009 | Tonkovich et al. | |
| 2010/0018584 A1 | 1/2010 | Bransky | |
| 2010/0181195 A1* | 7/2010 | Garcia Tello | B01L 3/50273 204/450 |
| 2011/0020141 A1 | 1/2011 | Van Zon et al. | |
| 2011/0220505 A1 | 9/2011 | Wang et al. | |
| 2012/0298233 A1 | 11/2012 | Rothacher | |
| 2013/0118901 A1 | 5/2013 | Pollack et al. | |
| 2013/0121892 A1 | 5/2013 | Fuhrmann | |
| 2013/0206597 A1 | 8/2013 | Hang | |
| 2014/0051159 A1 | 2/2014 | Bergstedt | |
| 2014/0083858 A1 | 3/2014 | Teh et al. | |
| 2015/0001083 A1 | 1/2015 | Martin | |
| 2015/0306598 A1 | 10/2015 | Khandros | |
| 2016/0296929 A1 | 10/2016 | Chen et al. | |
| 2017/0141278 A1 | 5/2017 | Hamaguchi | |
| 2018/0015460 A1 | 1/2018 | Sells | |

FOREIGN PATENT DOCUMENTS

| | | |
|---|---|---|
| CN | 104603595 A | 5/2015 |
| CN | 105916689 | 8/2016 |
| DE | 102004011667 | 11/2005 |
| EP | 1643288 A2 | 4/2006 |
| JP | 3772780 | 10/2003 |
| JP | 2004000935 | 1/2004 |
| JP | 2005292092 | 10/2005 |
| JP | 2010539503 | 12/2010 |
| JP | 2012112724 | 6/2012 |
| JP | 2016153725 | 8/2016 |
| TW | 200534916 | 11/2005 |
| TW | 200911375 | 3/2009 |
| TW | 201525464 | 7/2015 |
| WO | WO-2005075081 | 8/2005 |
| WO | WO-2006044966 | 4/2006 |
| WO | WO-2009004533 | 1/2009 |
| WO | WO-2012085728 | 6/2012 |
| WO | WO-2014165373 | 10/2014 |
| WO | WO-2015019520 | 2/2015 |
| WO | WO-2016111251 | 7/2016 |
| WO | WO-2016122554 | 8/2016 |
| WO | WO-2016122572 | 8/2016 |

OTHER PUBLICATIONS

Brown; "An Experimental Validation of the Pressure Capacity of a Modular Gasketless Microfludic Interconnect"; 18th Int. Conf. on Miniaturized Systems for Chemistry and Life Sciences; Oct. 26-30, 2014.

Jung; "A Novel Actuation Method of Transporting Droplets by Using Electrical Charging of Droplet in a Dielectric Fluid"; Biomicrofluidics; Apr. 20, 2009.

Zhou; "One-Step Injection Molding of Oste+ Microfluidic Devices with Screw Threaded Ports"; 18th Int. Conf, on Miniaturized Systems for Chemistry and Life Sciences; October 26-30.

Xu; "A Droplet-Manipulation Method for Achieving High-Throughput in Cross-Referencing-Based Digital Microfluidic Biochips"; Nov. 11, 2008.

Le; "Fabrication of 25 M-filter Microfluidic Chip on Silicon Substrate"; Advances in Natural Sciences: Nanoscience and Nanotechnology; 2017; http://iopscience.iop.org/article/10.1088/2043-6254/8/1/015003/pdf.

Wood; "Microfabricated High-Throughput Electronic Particle Detector"; http://clelandlab.uchicago.edu/pdf/wood%20requa%20rsi%202007.pdf; Oct. 5, 2007.

* cited by examiner

MICROFLUIDIC CHIP

BACKGROUND

Digital microfluidics (DMF) is a technique where discrete fluid droplets are manipulated on microfluidic chips embedded in a substrate. The manipulation of the discrete fluidic droplets is in a volume range of microliters ($10^{-6}$ L) to picoliters ($10^{-12}$ L). Manipulation of the fluid droplets is performed with tubing or channels. The use of tubing and channels, however, creates large volume transfer that can lead to waste and time inefficiency.

DETAILED DESCRIPTION

Disclosed herein is an example microfluidic device (chip) that facilitates the movement of discrete fluid droplets from one microfluidic sub-chip to another microfluidic sub-chip using an electric field. Typically, fluids are moved between microfluidic chips using tubing, channels, capillary action, etc. Moving fluids by conventional techniques, however, creates large volumes (dead volume), which increases the time to transfer the fluid from chip to chip. In addition, the larger volumes of transferred fluid usually results in wasted fluid. The subject disclosure overcomes these disadvantages by providing a microfluidic device that applies an electric field in a gap between adjacent, coplanar microfluidic sub-chips that are supported on a common substrate, whereby the electric field facilitates the movement of the discrete fluid droplets from one microfluidic sub-chip to another.

Figure 1:
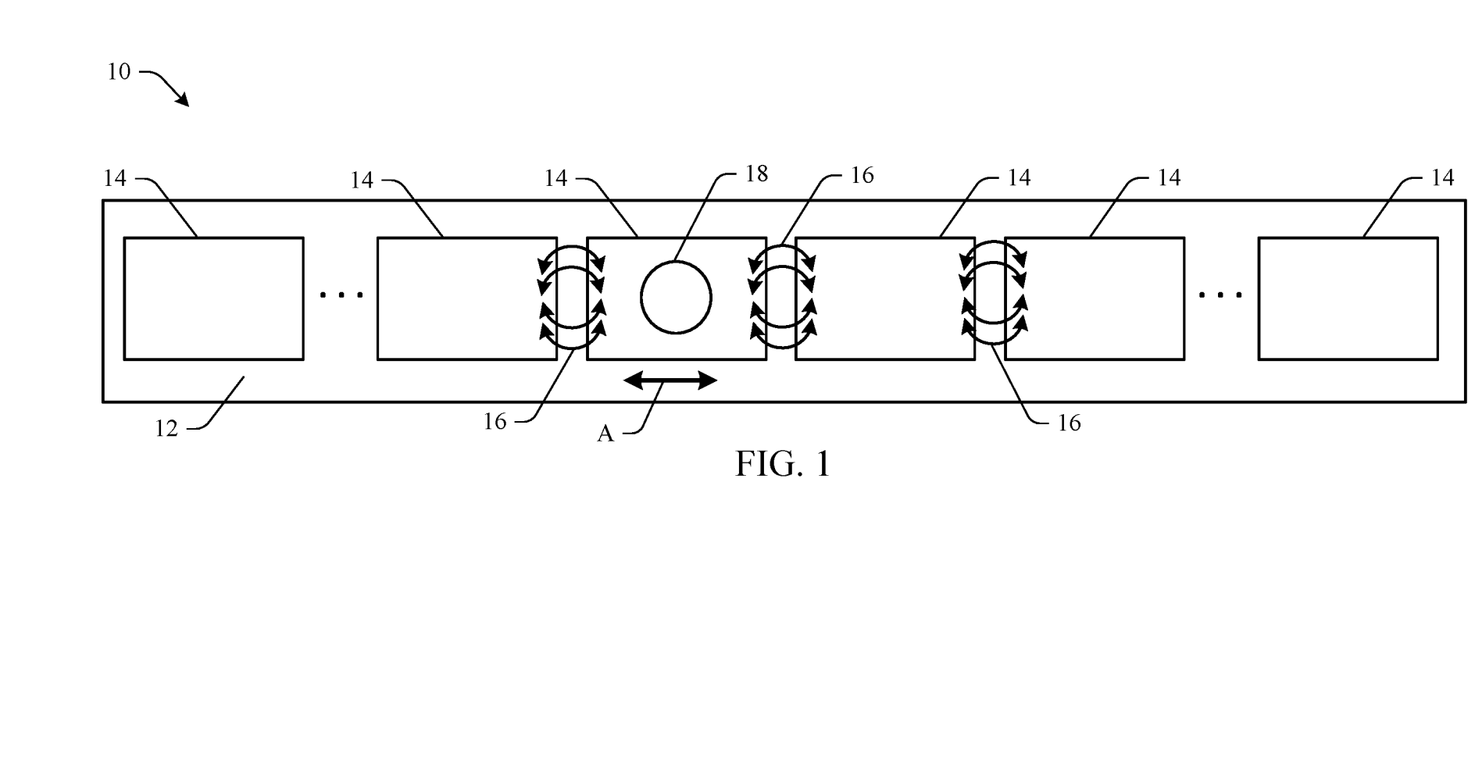
FIG. 1 illustrates a top view of an example microfluidic chip.

FIG. 1 is a top view of an example microfluidic chip (device) 10 that facilitates movement of a discrete fluid droplet (hereinafter "droplet") between adjacent microfluidic sub-chips. As used herein, the droplet can be a volume of fluid in the microfluidic range (e.g., microliters ($10^{-6}$ L) to picoliters ($10^{-12}$ L)). The microfluidic device 10 includes a substrate (base layer) 12 and a number of microfluidic sub-chips 14. In one example, the substrate 12 can be made from a polymer material, such as an Epoxy Molded Compound (EMC). An electric field 16 is applied between adjacent microfluidic sub-chips 14 such that the electric field 16 moves a discrete fluid droplet 18 across a gap along an inter-chip path extending from one microfluidic sub-chip 14 to another microfluidic sub-chip 14, as indicated by the double arrow A.

Figure 2A:
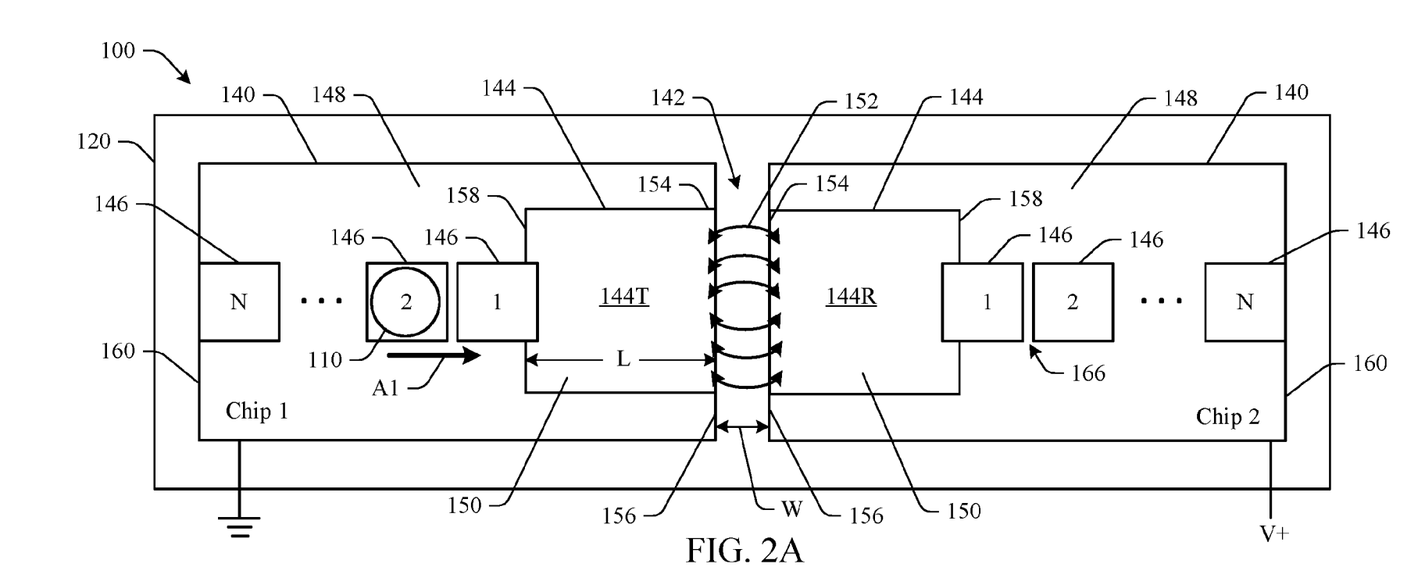
FIGS. 2A and 2B illustrate a top and side view respectively of another example microfluidic chip.
Figure 2B:
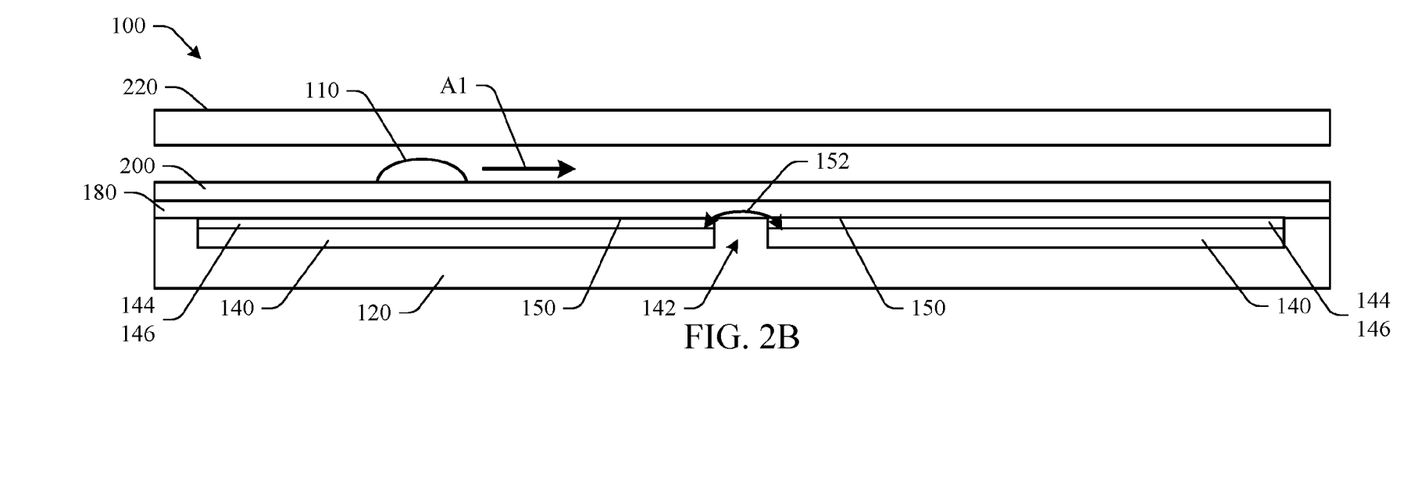

FIGS. 2A and 2B are top and side views respectively of another example microfluidic device (chip) 100 that facilitates the movement of a discrete fluid droplet (hereinafter "droplet") 110 between adjacent microfluidic sub-chips. The microfluidic device 100 includes a substrate (base layer) 120 and a number of microfluidic sub-chips 140. A dielectric layer 180 is disposed over the microfluidic sub-chips 140 and covers the substrate 120. Thus, the dielectric layer 180 bridges a transfer gap 142 between adjacent microfluidic sub-chips 140. The dielectric layer 180 may be spun on or sputtered onto the substrate 120. A hydrophobic layer 200 can be provided and is disposed over the dielectric layer 180. The hydrophobic layer 200 may be spun on and made of a polymer material, such as but not limited to polytetrafluoroethylene (PTFE) and derivatives thereof facilitates a sliding movement of the droplet 110 along the contact surface thereof. PTFE is commercially available from E. I. DuPont De Nemours & Company of Wilmington, Del. as the product TEFLON®.

The microfluidic sub-chips 140 can include silicon, (Si), glass, polymer, etc. and include an electrode layer that includes a transfer electrode 144 and multiple transport electrodes 146 disposed on a first surface 148 thereof. In some examples, the transfer electrodes 144 are larger than the transport electrodes 146, each having a square shape along the surface 148. The microfluidic sub-chips 140 are embedded in the substrate 120 such that the first surface 148 of the microfluidic sub-chips 140 and, hence, a first surface 150 of the electrodes 144, 146 between different microfluidic sub-chips 140 are substantially coplanar to each other. As used herein, "substantially coplanar" refers to aligning the first surface 150 of electrodes 144, 146 on different microfluidic sub-chips 140 with respect to each other such that movement of the discrete fluid droplet from one microfluidic sub-chip 140 to another microfluidic sub-chip 140 is not substantially impeded by changes in elevation. Adjacent microfluidic sub-chips 140 are separated by the gap 142. As will be explained further below, an electric field 152 is applied between electrodes across the gap 142 such that the electric field 152 moves the droplet 110 across the gap 142 along an inter-chip path extending from one microfluidic sub-chip 140 to another microfluidic sub-chip 140, namely from one transfer electrode 144 to another transfer electrode 144 based on the application of the electric field.

Figure 2C:
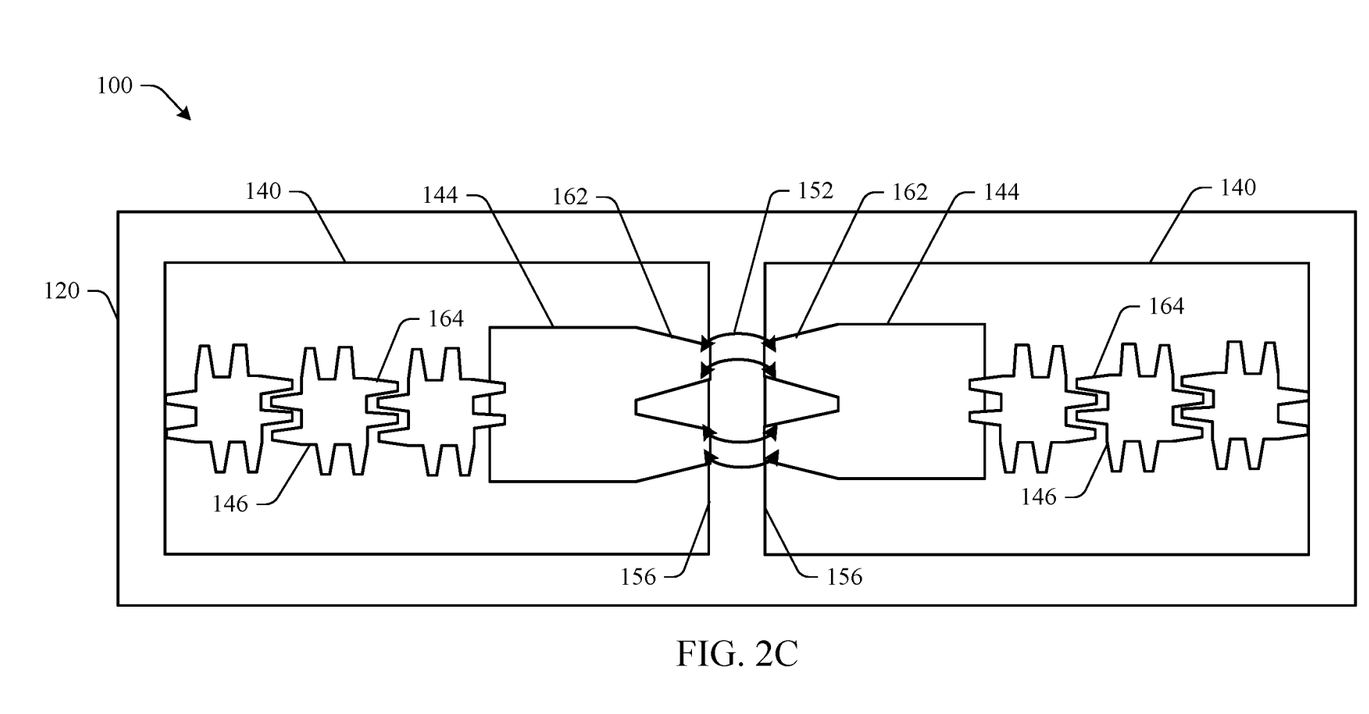
FIG. 2C illustrates a top view of another example microfluidic chip illustrating a shape of electrodes.

The transfer electrode 144 is arranged on the surface 148 of the microfluidic sub-chip 140 such that a proximate edge 154 of the transfer electrode 144 is within a predetermined distance (e.g., 10 um) of a proximate edge 156 of the microfluidic sub-chip 140. In another example, the proximate edge 154 of the transfer electrode 144 may also be flush, as illustrated in the figures, with the proximate edge 156 of the microfluidic sub-chip 140. The multiple transport electrodes 146(1-N) are arranged from a distal end 158 of the transfer electrode 144 to a distal end 160 of the microfluidic sub-chip 140. The shape of the electrodes 144, 146 is not limited to the particular construction disclosed herein. As those of skill in the art will understand, the shape of the electrodes 144, 146 can be circular, rectangular, triangular, have an irregular shape, etc. For example, as shown in FIG. 2C, the transfer electrodes 144 can include protrusions/extensions 162 that extend toward the proximate end 156 of the microfluidic sub-chip 140. The transport electrodes 146 can include fingers 164 that intermingle with the fingers 164 on adjacent transport electrodes 146. The transport electrodes 146(1-N) are separated by a transport gap 166 that has a width smaller than a width W of the gap 142. Thus, a strength or magnitude of the electric field applied between the transport electrodes 146(1-N) is smaller than a strength or magnitude (explained further below) of the electric field 152 applied between microfluidic sub-chips 140 for a given AC or DC input signal that is applied.

The width W of the gap 142 between adjacent microfluidic sub-chips 140 is measured from the proximate edge 154 of the transfer electrode 144 from one microfluidic sub-chip 140 to the proximate edge 154 of the transfer electrode 144 from an adjacent microfluidic sub-chip 140. To facilitate transfer of the discrete fluid droplet between microfluidic sub-chips 140, the width W of the gap 142 is smaller than a length L of the transfer electrode 144. For example, the width W of the gap 142 may be 5%-20% the length L of the transfer electrode 144. During the manufacturing process, the width W of the gap 142 is determined based on the application of the microfluidic device 100. Once the gap 142 is determined, the length L of the transfer electrodes 144 is determined. As mentioned, each of the transfer electrodes 144 and the transport electrodes may have a square shape.

In order to transfer the droplet 110 from one microfluidic sub-chip 140 to another microfluidic sub-chip 140, the electrode 144 transferring the droplet 110 (transferring electrode 144T) is grounded and a voltage (e.g., positive voltage V+) is applied to the electrode 144 receiving the droplet 110 (receiving electrode 144R). In the example illustrated in FIGS. 2A and 2B, the droplet 110 moves in a direction of the arrow A1. Thus, the transferring electrode 144T is disposed on the transferring microfluidic sub-chip (chip 1) and the receiving electrode 144R is disposed on the receiving microfluidic sub-chip (chip 2). The electric field 152 is generated between the two microfluidic sub-chips 140 (chip 1, chip 2) such that the electric field 152 intersects with the proximate edges 154 of both the transferring and receiving electrodes 144T, 144R. The force of the electric field 152 causes the droplet 110 to slide across the gap 142 along the hydrophobic layer 200 from the transferring electrode 144T to the receiving electrode 144R.

The electric field 152 can be generated from a DC or AC source (signal generator). If the electric field 152 is generated from a DC source, the field direction, which affects the double layer polarization under the droplet 110, directs the movement of the droplet 110. In examples where the electric field 152 is generated by an AC source, the frequency is approximately 10-20 kHz. The shape of the transfer electrodes 144 determines a direction of an electric field gradient and a chemistry of the droplet 100 determines if the droplet 110 moves up or down the electric field gradient.

A magnitude of the electric field 152 is based on a cleanliness level of the hydrophobic layer 200 and the voltage applied to the transferring electrode 144T. The cleanliness level is based on the amount of contamination in a surface of the hydrophobic layer 200. Contamination may be in the form of micro-sized (and smaller) particles, non-volatile residue, metals, toxic chemicals, and other impurities deposited on the surface of the hydrophobic layer 200. The cleanliness level of the hydrophobic layer 200 is set to a level sufficient to enable the droplet 110 to move between adjacent microfluidic sub-chips 140, such as in response to the electric field applied at a voltage between 50-900V and for AC sources at a frequency of 10-20 kHz.

The electric field 152 is applied between the two microfluidic sub-chips 140 until the droplet 110 moves from the transferring electrode 144T to the receiving electrode 144R. Monitoring the location of the droplet 110 to determine if the droplet 110 has moved can be performed by measuring impedance between an electrically ground conducting cover 220 and the electrodes 144, 146. The cover 220 is disposed above the hydrophobic layer 200 and covers the substrate 120. The droplet 110 is disposed between the hydrophobic layer 200 and the cover 220. Impedance (e.g., capacitance and/or resistance) or other electrical characteristics between the cover 220 and each of the electrodes 144, 146 along microfluidic device 100 can be measured. Based on the properties of the fluid, the device 10 can be calibrated to detect an expected impedance of the droplet 110. The impedance of air (or another fluid that may fill the device 100) will have a different value than the impedance of the air plus the impedance of the droplet 110. For example, as the droplet 110 moves from the transferring electrode 144T to the receiving electrode 144R, the impedance between the cover 220 and the transferring electrode 144T will change from the impedance of the air plus the impedance of the droplet 110 to the impedance of the air. Similarly, the impedance between the cover 220 and the receiving electrode 144R will change from the impedance of the air to the aggregate impedance of air and the droplet 110. Thus, the location of the droplet 110 can be determined by the detecting change in impedance between the cover 220 and each of the electrodes 144T, 144R. Therefore, movement may be detected by monitoring for changes in impedance.

As a further example, the integration of the microfluidic sub-chips 140 into the substrate 120 is performed via an overmolding process. The overmolding process insures that the microfluidic chips 140 chips and, hence, the electrodes 144 are in close proximity (e.g., <50 um) with each other so that reasonable voltages can be applied to move the droplets 110. In addition, different microfluidic sub-chips 140 integrated into the same substrate can be made of different materials (e.g., silicon, glass, polymer, etc.). Still further, different microfluidic sub-chips 140 integrated into the same substrate 120 can perform different functions. For example, one microfluidic sub-chip 140 can control chemical reactions whereas another microfluidic sub-chip 140 can control temperature. Other examples can include photo-detection, spectra-scope readouts, environmental control, etc. The overmolding can includes wire traces disposed in etched channels that attach the electrodes 144, 146 to external devices.

Figure 3A:
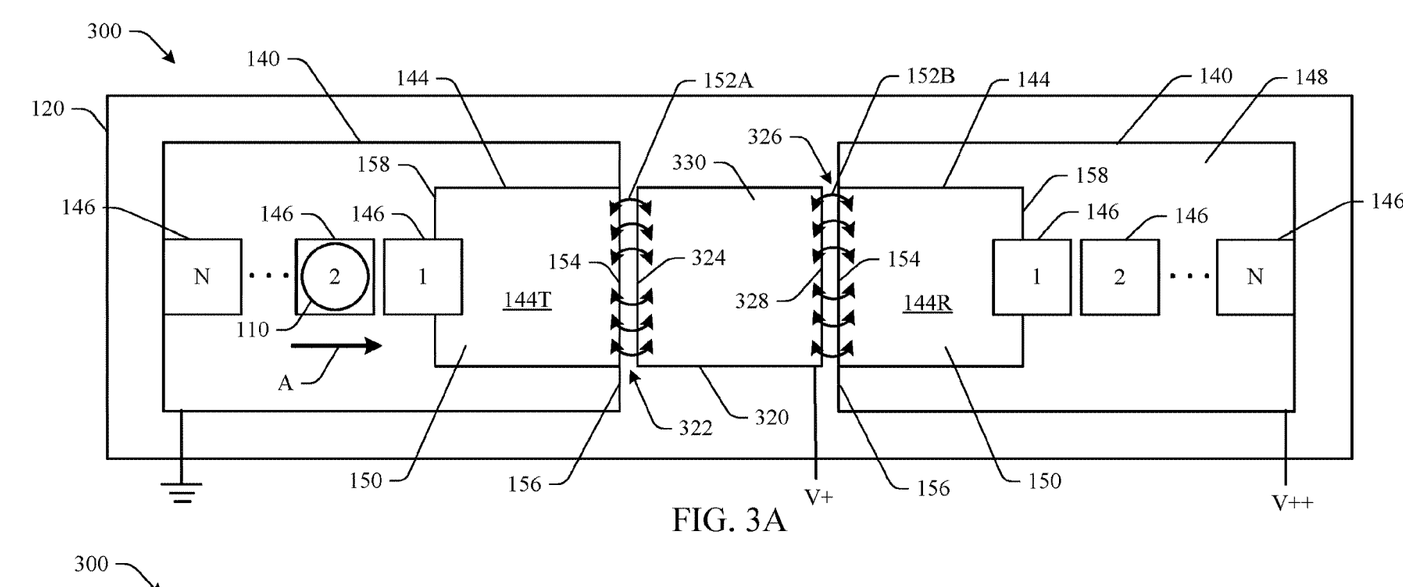
FIGS. 3A and 3B illustrate a top and side view respectively of another example microfluidic chip.
Figure 3B:
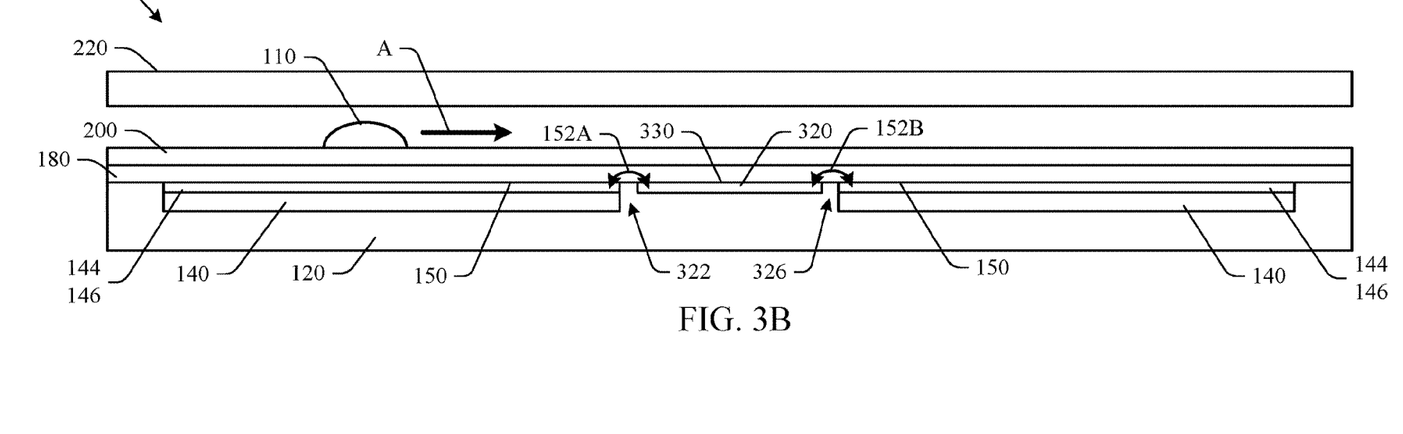
Figure 3C:
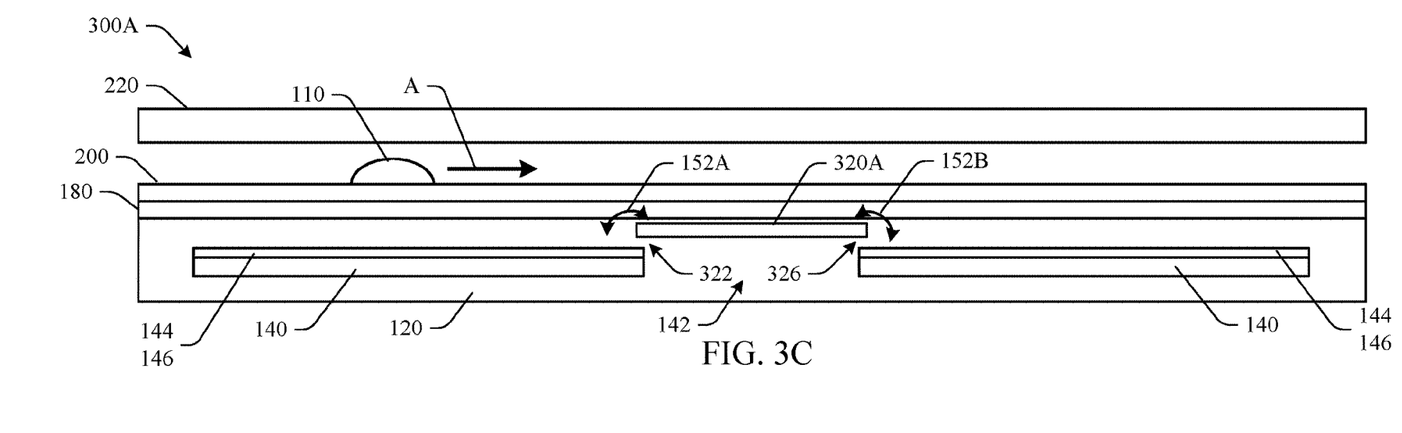
FIG. 3C illustrates a side view of another example of the microfluidic chip of FIG. 3A.

Referring to FIGS. 3A-3C, FIGS. 3A and 3B are top and side views, respectively, of another example microfluidic device (chip) 300 that facilitates the movement of a discrete fluid droplet (hereinafter "droplet") 110 between adjacent microfluidic sub-chips 140. The microfluidic device 300 is similar to the microfluidic device 100 described above and illustrated in FIGS. 2A and 2B with the exception of the addition of a substrate electrode 320. Thus, all like features will include the same reference numbers and descriptions of such features will not be repeated.

The substrate electrode 320 is also embedded in the substrate 120 and resides in the gap 142 between an adjacent pair of microfluidic sub-chips 140. Thus, a first gap 322 is created between an adjacent edge 154 of the transferring electrode 144T and a first edge 324 of the substrate electrode 320 and a second gap 326 is created between a second edge 328 of the substrate electrode 320 and an adjacent edge 154 the receiving electrode 144R. In the example of FIGS. 3A and 3B, the shape and size of the substrate electrode 320 is similar in shape and size to the transfer electrodes 144. In addition, a width of the first and second gaps 322, 326 is similar in size as the gap 142 described above.

The substrate electrode 320 is electrically connected to a power supply to selectively supply an electric field to the electrode during movement of a droplet to or from the electrode, such as via electrical traces or wires. Thus, similar to the example above, in order to transfer the droplet 110 from one microfluidic sub-chip 140 to another microfluidic sub-chip 140, the transferring electrode 144T is grounded and the potential V+ is applied from the power supply to the substrate electrode 320 and another higher V++ is applied from the power supply to the receiving electrode 144R. A first electric field 152A is generated between the transferring electrode 144T and the substrate electrode 320 to move a droplet between such electrodes. A second electric field 152B is generated between the second edge 328 of the substrate electrode 320 and the receiving electrode 144R to move a droplet between such electrodes. The force of the electric fields 152A, 152B causes the droplet 110 to move along the hydrophobic layer 200 across the first and second gaps 322, 326 from the transferring electrode 144T to the substrate electrode 320 and then to the receiving electrode 144R.

In one example, as illustrated in FIG. 3B, a first surface 330 of the substrate electrode 320 may be coplanar with the first surface 150 of both the transferring electrode 144T and the receiving electrode 144R. In another example, as illustrated in FIG. 3C, the first surface 330 of the substrate electrode 320A may be disposed on a different plane as the first surface 150 of the transferring and receiving electrodes 144T, 144R. Thus in this example, the substrate electrode 320A bridges the gap 142 between microfluidic sub-chips 140.

Figure 4:
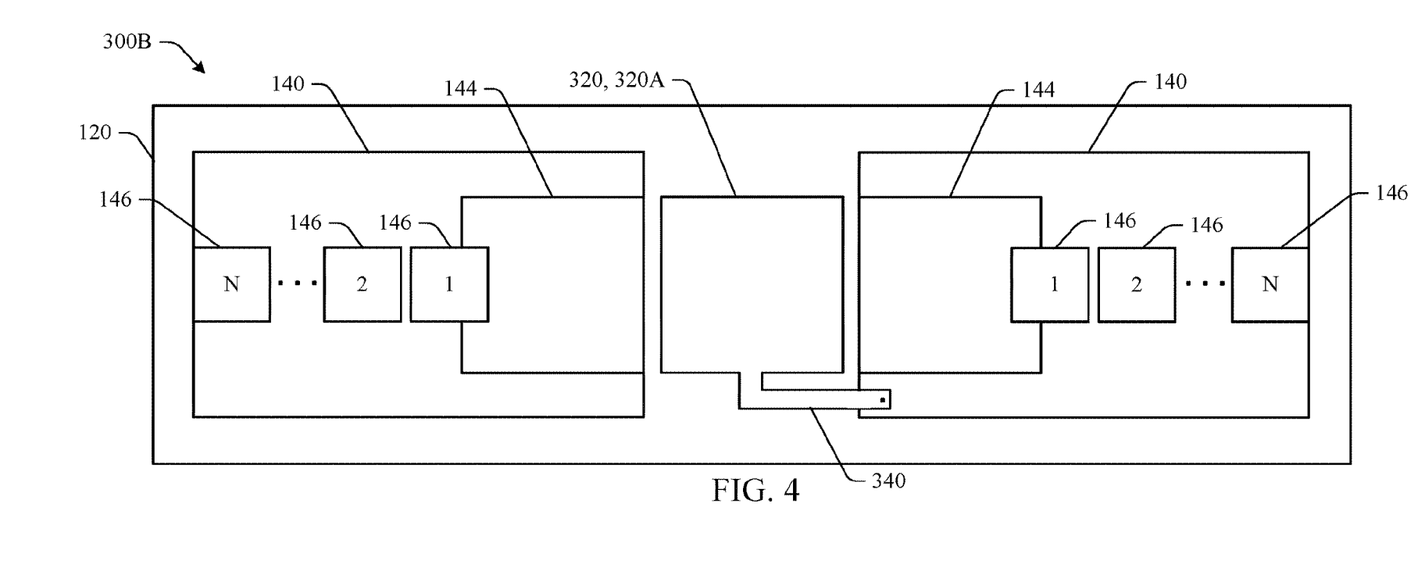
FIG. 4 illustrates a top view of another example of a microfluidic chip including an electrode disposed on a substrate having a control arm.

In another example microfluidic chip 300B illustrated in FIG. 4, the substrate electrode 320 or 320A can communicate via control logic with one or more of the microfluidic sub-chips 140. A connection arm 340 can be provided that electrically connects the substrate electrode 320 or 320A to circuitry implemented on one or more of the microfluidic sub-chips 140. Additionally or alternatively, the arm 340 may connect the substrate electrode to off-chip circuitry, including a power supply. Activation and deactivation of the signal generator and/or the application of voltage to one or more of the electrodes 144, 146, 320, 320A can then be controlled by control logic. As mentioned, the control logic may be implemented on the connected chip 140 and/or off-chip (e.g., a microcontroller or processor) that is connected to the microfluidic chip device 300, 300A, 300B.

Figure 5:
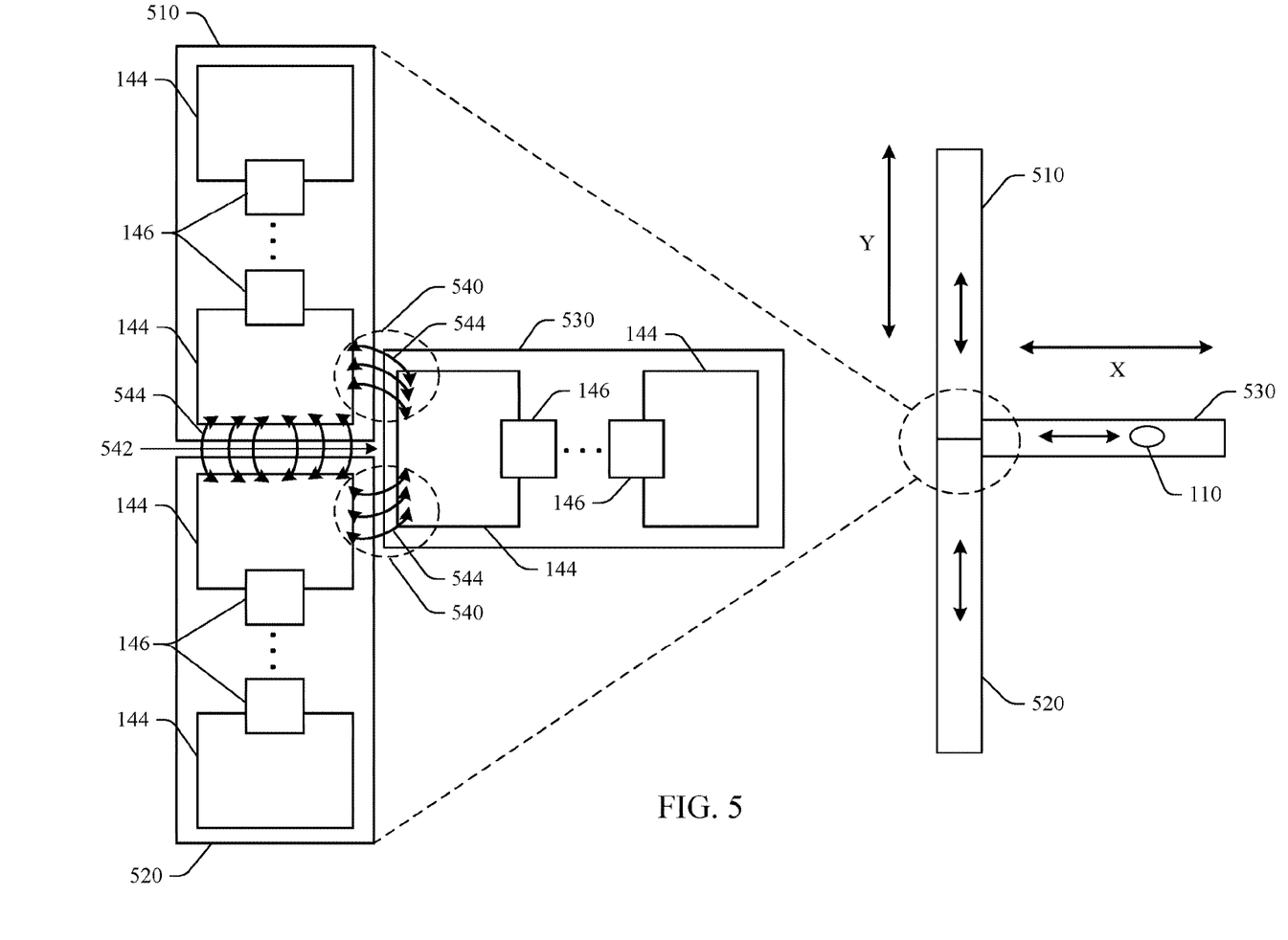
FIG. 5 illustrates a top view of an example microfluidic device having microfluidic sub-chips arranged along the same or different axis.

FIG. 5 illustrates a top view of an example microfluidic device 500 having microfluidic sub-chips 510, 520, 530 positioned on different axes (e.g., X and Y axes). The example microfluidic device 500 demonstrates that the droplet 110 can be transferred between more an adjacent pair of microfluidic sub-chips. For example, the droplet 110 can be transported between microfluidic sub-chips on different axis (e.g., from one microfluidic sub-chip 510 or 520 to microfluidic sub-chip 530 or from microfluidic sub-chip 530 to microfluidic sub-chip 510 or 520 or both simultaneously). The example microfluidic device 500 further illustrates that the droplet 110 can be transported simultaneously from two microfluidic sub-chips 510, 520 on a common axis to one microfluidic sub-chip 530 on a different axis or vice versa.

The microfluidic sub-chips 510, 520, 530 have similar features to the microfluidic sub-chips disclosed above. Thus, descriptions of the microfluidic sub-chips 510, 520, 530 will not be repeated. In addition, transfer of the droplet 110 between the microfluidic sub-chips on the same axis (i.e., microfluidic sub-chips 510, 520) is similar to the transfer described above and will not be repeated. The example illustrated in FIG. 5, however, further illustrates that the microfluidic sub-chips 510, 520, 530 can include a transfer electrode 144 at both ends to facilitate the movement of the droplet along a string of microfluidic sub-chips.

In addition, the microfluidic device 500 can include pinch structures 540 disposed in a gap 542 between microfluidic sub-chip 510 and microfluidic sub-chip 530, and/or between microfluidic sub-chip 520 and microfluidic sub-chip 530. The pinch structures 540 concentrate electric fields 544 between the microfluidic sub-chips 510, 520, 530 to facilitate transfer of the droplet 110.

The electric fields 544 are applied in a similar manner as described above. In order to transfer the droplet 110 between microfluidic sub-chips 510, 520, 530, the electrode on the microfluidic sub-chip(s) transferring the droplet 110 is grounded and a voltage (e.g., positive voltage V+) is applied to the electrode on the microfluidic sub-chip(s) receiving the droplet 110. For example, in order to transfer the droplet 110 from one microfluidic sub-chip 510 and/or 520 to microfluidic sub-chip 530, the electrode on one or both microfluidic sub-chips 510, 520 transferring the droplet 110 are grounded and a voltage (e.g., positive voltage V+) is applied to the microfluidic sub-chip 530 receiving the droplet 110.

Figure 6:
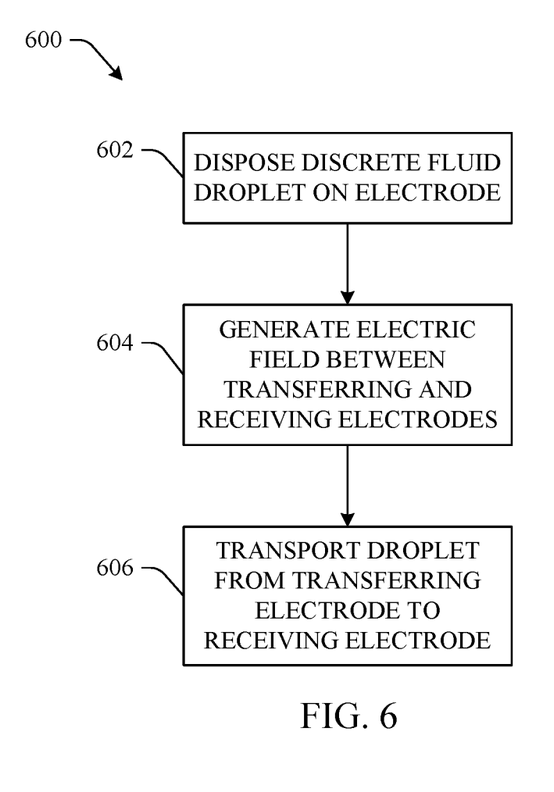
FIG. 6 is flow diagram illustrating an example method of transporting a fluid droplet between adjacent microfluidic sub-chips.
Figure 7:
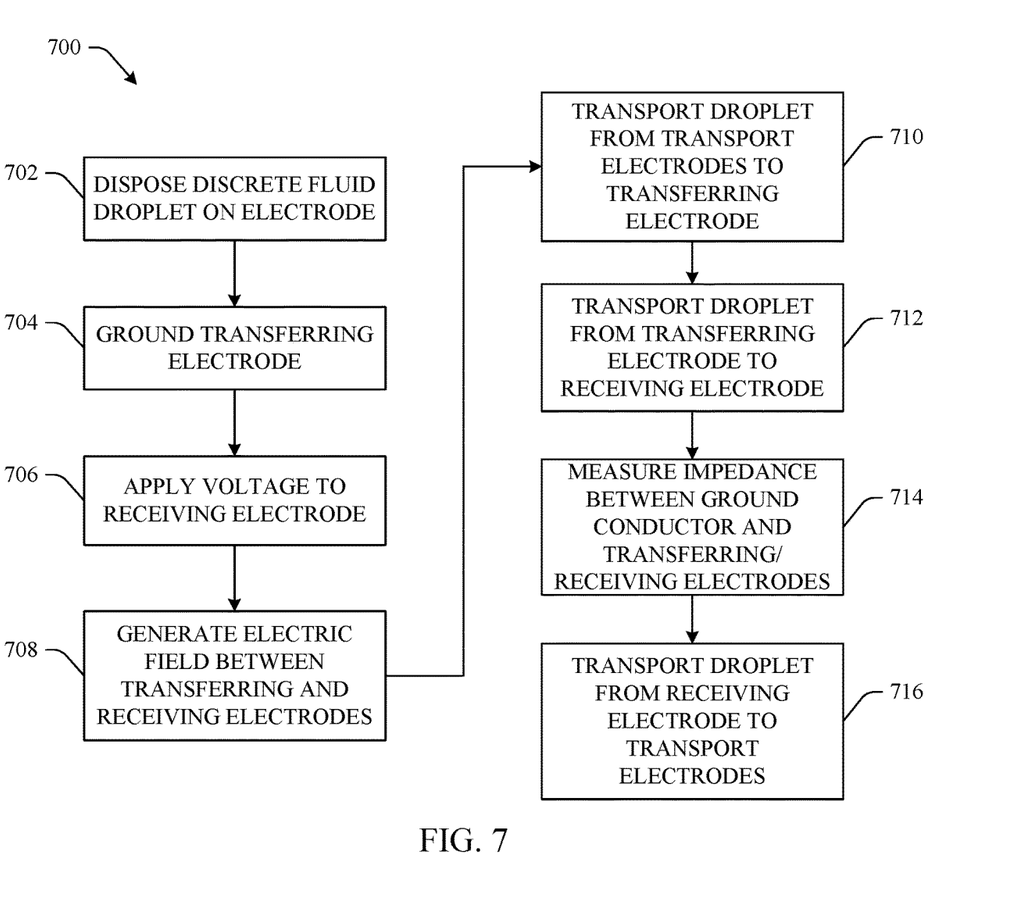
FIG. 7 is flow diagram illustrating another example method of transporting a fluid droplet between adjacent microfluidic sub-chips.

In view of the foregoing structural and functional features described above, a method shown herein, e.g., in the form of flow charts, in accordance with various aspects of the present disclosure will be better appreciated with reference to FIGS. 6 and 7. While, for purposes of simplicity of explanation, the method of FIGS. 6 and 7 are shown and described as executing serially, it is to be understood and appreciated that the present disclosure is not limited by the illustrated order, as some aspects could, in accordance with the present disclosure occur in different orders and/or concurrently with other aspects from that shown and described herein. Moreover, not all illustrated features may be required to implement a method in accordance with an aspect of the present disclosure.

FIG. 6 is a flow diagram illustrating an example method 600 of transporting a discrete fluid droplet (e.g., droplet 110) across a gap (e.g., gap 142) of adjacent microfluidic sub-chips (e.g., sub-chips 140). At 602, the droplet is disposed onto an electrode (e.g., electrodes 144, 146) on the transferring microfluidic sub-chip (e.g., chip 1). At 604, an electric field (e.g., electric field 152) is generated between an electrode (e.g., transferring electrode 144T) and another electrode (e.g., receiving electrode 144R), as described herein. At 606, the droplet is transported across the gap from the transferring electrode to the receiving electrode in response to the electric field.

FIG. 7 is an example method 700 of transporting the discrete fluid droplet (e.g., droplet 110) across a gap (e.g., gap 142) of adjacent microfluidic sub-chips (e.g., microfluidic sub-chips 140). At 702, the droplet is disposed onto an electrode (e.g., electrodes 144, 146) on the transferring microfluidic sub-chip (e.g., chip 1). At 704, an electrode (e.g., transferring electrode 144T) is grounded. At 706, a voltage is applied to another electrode (e.g., receiving electrode 144R) disposed on the receiving microfluidic sub-chip (e.g., chip 2). At 708, an electric field (e.g., electric field 152) is generated between the transferring electrode and the receiving electrode, as described herein. At 710, if the droplet is initially disposed on transport electrodes (e.g., transport electrodes 146(N−1)), the droplet is transported along the transport electrodes to the transferring electrode. At 712, the droplet is transported across the gap from the transferring electrode to the receiving electrode via the electric field, as described herein. At 714, impedance between a ground conductor (e.g., ground conducting cover 220) and the transferring electrode, and between the receiving electrode and the ground conductor is measured to determine the location of the droplet. At 716, the droplet is transported from the receiving electrode to the transport electrode and along the transport electrodes to.

The subject disclosure has several advantages over conventional means to transport the droplet between microfluidic sub-chips. First, the motion of the droplet can be easily controlled and timed. There is no dead volume during the transfer. The subject disclosure allows for the building of multi-microfluidic chip devices, where each device can have a particular function. This leads to cost savings in both manufacturing and design. Further, the components can be easily reused and applied to new and different applications.

Described above are examples of the subject disclosure. It is, of course, not possible to describe every conceivable combination of components or methodologies for purposes of describing the subject disclosure, but one of ordinary skill in the art may recognize that many further combinations and permutations of the subject disclosure are possible. Accordingly, the subject disclosure is intended to embrace all such alterations, modifications and variations that fall within the spirit and scope of the appended claims. In addition, where the disclosure or claims recite "a," "an," "a first," or "another" element, or the equivalent thereof, it should be interpreted to include one or more than one such element, neither requiring nor excluding two or more such elements. Furthermore, to the extent that the term "includes" is used in either the detailed description or the claims, such term is intended to be inclusive in a manner similar to the term "comprising" as "comprising" is interpreted when employed as a transitional word in a claim. Finally, the term "based on" is interpreted to mean at least based in part.

What is claimed is:

1. A device comprising:
   a substrate;
   a plurality of microfluidic sub-chips embedded in the substrate; and
   a plurality of electrodes positioned to apply an electric field between an adjacent pair of microfluidic sub-chips of the plurality of microfluidic sub-chips, the electric field being sufficient to move a fluid droplet along the substrate from one of the adjacent pair of microfluidic sub-chips to another of the adjacent pair of microfluidic sub-chips;
   wherein an electrode of each of the plurality of electrodes includes a transfer electrode, each transfer electrode having an edge that is adjacent an edge of the microfluidic chip sub-chip on which it is disposed, the edge of the transfer electrode having a length at least ten times that of a width of a gap between the adjacent pair of microfluidic sub-chips.

2. The device of claim 1, wherein a plurality of electrodes are disposed on a surface thereof, the surfaces of the different microfluidic sub-chips of the plurality of microfluidic sub-chips being substantially coplanar.

3. The device of claim 1 further comprising a dielectric layer disposed over the plurality of microfluidic sub-chips and covering an exposed surface of the substrate into which the microfluidic sub-chips are embedded.

4. The device of claim 3 further comprising a hydrophobic layer disposed over the dielectric layer, wherein the fluid droplet slides along the hydrophobic layer from the one of the adjacent pair of microfluidic sub-chips to the other of the adjacent pair microfluidic sub-chips in response to application of the electric field.

5. The device of claim 4 further comprising a ground conductor cover spaced part from and overlying the hydrophobic layer to enable an impedance measurement between the ground conductor cover and each the plurality of electrodes to determine a location of the droplet.

6. The device of claim 1, wherein upon application of the electric field, a voltage is applied to one microfluidic sub-chip of the adjacent pair of microfluidic sub-chips receiving the droplet and another microfluidic sub-chip of the adjacent pair of microfluidic sub-chips transferring the droplet is grounded.

7. A device comprising:
   a substrate;
   a plurality of microfluidic sub-chips embedded in the substrate; and
   electrodes positioned to apply an electric field between an adjacent pair of microfluidic sub-chips of the plurality of microfluidic sub-chips, the electric field being sufficient to move a fluid droplet along the substrate from one of the adjacent pair of microfluidic sub-chips to another of the adjacent pair of microfluidic sub-chips;
   wherein each of the plurality microfluidic sub-chips includes an adjacent pair of microfluidic sub-chips disposed on a common axis, each of the adjacent pair of microfluidic sub-chips having a transfer electrode disposed on a surface thereof, and
   at least one microfluidic sub-chip disposed on a different axis, the at least one microfluidic sub-chip having a transfer electrode disposed on a surface thereof, wherein the transfer electrodes of the adjacent pair of microfluidic sub-chips and the transfer electrode of the at least one microfluidic sub-chip are adjacent to allow the electric field to move the fluid droplet from the adjacent pair of microfluidic sub-chips to the at least one microfluidic sub-chip or to move the fluid droplet from the at least one microfluidic sub-chip to the adjacent pair of microfluidic sub-chips.

8. The device of claim 1 further comprising a substrate electrode disposed between the adjacent pair of microfluidic sub-chips.

9. The device of claim 2 further comprising:
   a dielectric layer disposed over the plurality of microfluidic sub-chips and covering an exposed surface of the substrate into which the microfluidic sub-chips are embedded; and
   a hydrophobic layer disposed over the dielectric layer,
   wherein the electrodes are positioned so that the electric field is applied between the adjacent pair microfluidic sub-chips of the plurality of microfluidic sub-chips to move a fluid droplet along the hydrophobic layer from one of the adjacent pair of microfluidic sub-chips to another of the adjacent pair of microfluidic sub-chips.

10. The microfluidic device of claim 9, wherein an electrode of each of the plurality of electrodes includes a transfer electrode, each transfer electrode having an edge that is adjacent an edge of the respective microfluidic sub-chip on which it is disposed, the edge having a length at least ten times that of a width of a gap between the adjacent pair of microfluidic sub-chips.

11. The microfluidic device of claim 9, wherein a substrate electrode is disposed between an adjacent pair of microfluidic sub-chips.

12. The microfluidic device of claim 11, wherein the electric field is applied between one of the adjacent pair microfluidic sub-chips and a first edge of the substrate electrode and between a second edge of the substrate electrode and another of the adjacent pair of microfluidic sub-chips to move a fluid droplet along from the one of the adjacent pair of microfluidic sub-chips to the other of the adjacent pair microfluidic sub-chips.

13. A method comprising:
- disposing a fluid droplet on a transferring electrode of a plurality of electrodes embedded in a substrate of one microfluidic sub-chip of a plurality of microfluidic sub-chips;
- generating an electric field across a gap between microfluidic sub-chips between the transferring electrode and a receiving electrode another plurality of electrodes embedded in a substrate of another microfluidic sub-chip of the plurality of microfluidic sub-chips; and
- moving the droplet from the one microfluidic sub-chip to the other microfluidic sub-chip in response to the electric field.

14. The method of claim 13, wherein a first surface of the transferring electrode and a first surface of the receiving electrode are coplanar.

15. The device of claim 1, wherein each of the plurality of microfluidic sub-chips includes a transfer electrode and multiple transport electrodes.

16. The device of claim 15, wherein the transfer electrode comprises a protrusion that extends towards a proximate end of the microfluidic sub-chip.

17. The device of claim 15, wherein a gap between transport electrodes is smaller than a gap between adjacent microfluidic sub-chips.

18. The device of claim 8, wherein the substrate electrode is on a different plane than the electrodes on adjacent microfluidic sub-chips.

19. The device of claim 8, further comprising a connection arm to electrically connect the substrate electrode to circuitry of a microfluidic sub-chip.

* * * * *